US009111471B2

(12) United States Patent
Xu et al.

(10) Patent No.: US 9,111,471 B2
(45) Date of Patent: Aug. 18, 2015

(54) SHEETING WITH DYNAMIC THREE-DIMENSIONAL IMAGES AND MANUFACTURE DEVICE THEREOF

(75) Inventors: Liangheng Xu, Shanghai (CN); Aiming Ge, Shanghai (CN); Yun Gao, Shanghai (CN); Kai Yang, Shanghai (CN)

(73) Assignee: Shanghai Techsun Anti-Counterfeiting Technology Holding Co., Ltd., Shanghai (CN)

( * ) Notice: Subject to any disclaimer, the term of this patent is extended or adjusted under 35 U.S.C. 154(b) by 843 days.

(21) Appl. No.: 13/125,763

(22) PCT Filed: Aug. 11, 2009

(86) PCT No.: PCT/CN2009/073175
§ 371 (c)(1), (2), (4) Date: May 24, 2011

(87) PCT Pub. No.: WO2010/045815
PCT Pub. Date: Apr. 29, 2010

(65) Prior Publication Data

US 2011/0216406 A1 Sep. 8, 2011

(30) Foreign Application Priority Data

Oct. 23, 2008 (CN) .......................... 2008 2 0154403
Oct. 23, 2008 (CN) .......................... 2008 2 0154404

(51) Int. Cl.
*G03B 21/60* (2014.01)
*G09F 19/14* (2006.01)
(Continued)

(52) U.S. Cl.
CPC ................ *G09F 19/14* (2013.01); *B42D 25/29* (2014.10); *B42D 25/41* (2014.10); *B44F 1/045* (2013.01); *B44F 7/00* (2013.01); *B42D 2035/20* (2013.01); *B42D 2035/44* (2013.01)

(58) Field of Classification Search
CPC .. G02B 27/10; G02B 27/2214; G02B 3/0037; G02B 3/0043; G02B 3/005; G02B 3/0056; G02B 5/02–5/0294; G02B 27/123; G02B 21/602; G02B 3/00–3/0087
USPC ......... 359/1–35, 618–640, 454–45, 455, 542, 359/599
See application file for complete search history.

(56) References Cited

U.S. PATENT DOCUMENTS 4,645,301 A 2/1987 Orensteen et al.
5,064,272 A 11/1991 Bailey et al.
(Continued)

FOREIGN PATENT DOCUMENTS

CN 1247359 A 3/2000
WO WO-2008060731 A2 5/2008

*Primary Examiner* — Stephone B Allen
*Assistant Examiner* — Jeffrey Madonna
(74) *Attorney, Agent, or Firm* — Dickstein Shapiro, LLP

(57) ABSTRACT

The present invention relates to a sheet enabling to form dynamic three-dimensional images and a device for preparing thereof. The sheet comprises a base layer (1), a transparent protective layer (2), a reflective layer (3), and pixel points (4) that can form images. The transparent protective layer (2) is disposed at one side of the base layer (1), the pixel points (4) are embedded in the transparent protective layer (2). The pixel points (4) consist of microlenses (401) tightly closed together. The reflective layer (3) is disposed downbently at a lower part of the microlenses (401), wherein picture-text is recorded in the reflective layer (3). There is an altitude difference H between horizontal positions of two adjacent pixel points (4). Microlenses (401) in any one of pixel point have the same curvature radius, and curvature radius of microlenses (401) in two adjacent pixel points (4) have a difference of 1 to 70 μm.

20 Claims, 2 Drawing Sheets

(51) Int. Cl.
*B44F 1/04* (2006.01)
*B44F 7/00* (2006.01)
*B42D 25/41* (2014.01)
*B42D 25/29* (2014.01)

(56) References Cited

U.S. PATENT DOCUMENTS

| | | | | |
|---|---|---|---|---|
| 5,119,235 | A * | 6/1992 | Umeda et al. | 359/619 |
| 5,706,134 | A * | 1/1998 | Konno et al. | 359/599 |
| 6,381,071 | B1 * | 4/2002 | Dona et al. | 359/621 |
| 2002/0145797 | A1 * | 10/2002 | Sales | 359/456 |
| 2003/0206342 | A1 * | 11/2003 | Reed et al. | 359/460 |
| 2004/0130790 | A1 * | 7/2004 | Sales | 359/619 |
| 2006/0017991 | A1 * | 1/2006 | Poulsen | 359/20 |
| 2006/0262411 | A1 | 11/2006 | Dunn et al. | |
| 2007/0238296 | A1 * | 10/2007 | Shimizu | 438/689 |
| 2010/0157424 | A1 * | 6/2010 | Katsuma et al. | 359/455 |
| 2010/0259818 | A1 * | 10/2010 | Mikoshiba | 359/459 |
| 2012/0019936 | A1 * | 1/2012 | Blessing et al. | 359/742 |

* cited by examiner

SHEETING WITH DYNAMIC THREE-DIMENSIONAL IMAGES AND MANUFACTURE DEVICE THEREOF

TECHNICAL FIELD

The present invention relates to a sheet that can record images and a device for preparing the sheet.

BACKGROUND ART

Film materials that can record images are widely used in anti-counterfeiting labels of various commodity packages, certificates, documents, etc, such as anti-counterfeiting trademarks of various commodities, driving license, passports, trademarks. In some U.S. patents a method for the preparation of image sheet is disclosed, wherein the images formed on a reflecting sheet can be seen only when viewing from an angle the laser radiates, i.e., the images in the sheet can be viewed only from limited angles. As a result, the image features shown on the sheet are limited.

Some documents disclose processes of image integration on a sheet, which is a complicated method. A three-dimensional image has to be synthesized by using a single or a plurality of cameras, shooting and recording the same object from different angles with a certain accuracy, and the real image of the object can be viewed only when radiating the synthesized image from the direction of viewing. As is disclosed in related patent documents, only flat and simple three-dimensional images can be synthesized with very complicated processes.

CONTENTS OF THE INVENTION

The object of the present invention is to provide a sheet enabling to form dynamic three-dimensional images and a device for preparing thereof to overcome the above defects of the prior art.

The sheet enabling to form dynamic three-dimensional images of the present invention comprises a base layer, a transparent protective layer, a reflective layer and pixel points that can form images.

The said transparent protective layer is disposed at one side of the base layer, the said pixel points are embedded in the said transparent protective layer.

The said pixel points that can form images consist of microlenses tightly closed together, the said reflective layer is disposed downbently at a lower part of the microlenses, picture-text is recorded in the reflective layer, the microlenses appear as a curved surface protruding upwardly or a curved surface bending downwardly, there is an altitude difference H between horizontal positions of two adjacent pixel points, microlenses in any one of pixel point have the same curvature radius, and curvature radius of microlenses in two adjacent pixel points have a difference of 1 to 70 μm.

The present invention also provides a device for preparing the said sheet enabling to form dynamic three-dimensional images, the said device comprises a laser, an astigmatism modulator, a beam expander, an autocollimator objective, a 45° total-reflection mirror, a positive aspheric mirror or negative aspheric mirror and a shading template provided with picture-text pores, the picture-text pores of the shading template are provided with negative aspheric lenses or positive aspheric lenses.

The said astigmatism modulator is disposed at one end of the laser, the said beam expander is disposed at another end of the astigmatism modulator, the said autocollimator objective is disposed at another end of the astigmatism modulator, the said 45° total-reflection mirror is disposed at another end of the autocollimator objective, the said shading template provided with the picture-text pores is disposed at a lower part of the 45° total-reflection mirror, the said positive aspheric mirror or negative aspheric mirror is disposed at a lower part of the shading template.

The present invention is prepared through the following steps:

Coating the said transparent protective layer at one side of the base layer by a conventional coating process of the field, then coating the said reflective layer on the protective layer 2, and finally embedding the pixel points in the upper part of the reflective layer of the transparent protective layer for obtaining a sheet.

Beam emitted from a laser, after being expanded and collimated, passes through the negative aspheric mirror or the positive aspheric mirror; and then passes through the shading template provided with the picture-text pores, wherein the picture-text pores of the shading template are provided with negative aspheric lenses or positive aspheric lenses; the resultant beam radiates on the above sheet and records the picture-text on the shading template onto the reflective layer to obtain a sheet enabling to form dynamic three-dimensional images.

The sheet enabling to form dynamic three-dimensional images of the present invention possesses the following properties: continuous images consisting of adjacent pixel points provide a three-dimensional perception, a part of the images is synthesized at an upper part or lower part of the sheet by the microlenses, and dynamic three-dimensional images are shown upon the change of sight line of people and direction of the sheet. The showing of dynamic three-dimensional images on a sheet refers that floating three-dimensional images are synthesized at the upper or lower part of the microlenses sheet, the images vary dynamically when viewing from different angles by observers. The images can span above the sheet, in the sheet, and beneath the sheet, and is different from conventional holographic images. The images on the sheet cannot be for copy, and the dynamic three-dimensional effect can be viewed visually.

The sheet enabling to form dynamic three-dimensional images of the present invention is applicable widely to such as identification cards, passports, diplomas, tickets, anti-counterfeiting trademarks of various products, images for those need to be specially marked such as fire alarm, and information display in instruments.

MODE OF CARRYING OUT THE INVENTION

Figure 1:
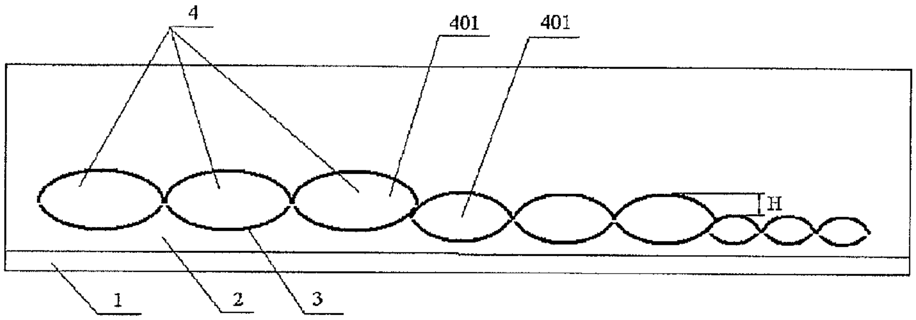
FIG. 1 is a sectional schematic diagram of the sheet enabling to form dynamic three-dimensional images.

Referring to FIG. 1, the sheet enabling to form dynamic three-dimensional images in the present invention comprises a base layer 1, a transparent protective layer 2, a reflective layer 3 and pixel points 4 that can form images.

The said transparent protective layer 2 is disposed at one side of the base layer 1, the said pixel points 4 are embedded in the said transparent protective layer 2.

The said pixel points 4 consist of microlenses 401 that are tightly closed together, the said reflective layer 3 is disposed downbently at a lower part of the said microlenses 401, wherein picture-text is recorded in the reflective layer 3, the said microlenses 401 appear as a curved surface protruding upwardly or a curved surface bending downwardly, there is an altitude difference H between horizontal positions of two adjacent pixel points 4, microlenses 401 in any one of pixel points 4 have the same curvature radius, and curvature radius of microlenses 401 in two adjacent pixel points 4 have a difference of 1 to 70 μm.

Preferably, the altitude difference H between horizontal positions of two adjacent pixel points 4 is 0.07 to 0.08 mm;

Preferably, the curvature radius of microlenses 401 is 0.065 to 0.075 mm, preferably 0.070 mm;

Preferably, the difference of curvature radius of microlenses 401 in two adjacent pixel points 4 is 10 to 20 μm;

Preferably, the number of microlenses 401 in the pixel points 4 is 2 to 42;

The said curved surface is a spheric or aspheric surface, preferably includes paraboloid, hyperboloid or high-order curved surface, etc, the most preferably paraboloid;

A material of the said base layer 1 is selected from polyurethane, polyacrylic acid or phenolic resin;

A material of the said protective layer 2 is selected from PVC(polyvinyl chloride), PP(polystyrene), PET(polyethylene terephthalate) or PU(polyurethane);

A material of the said microlenses 401 is PC or PMMA;

A material of the said reflective layer 3 is selected from Al or ZnS.

Figure 2:
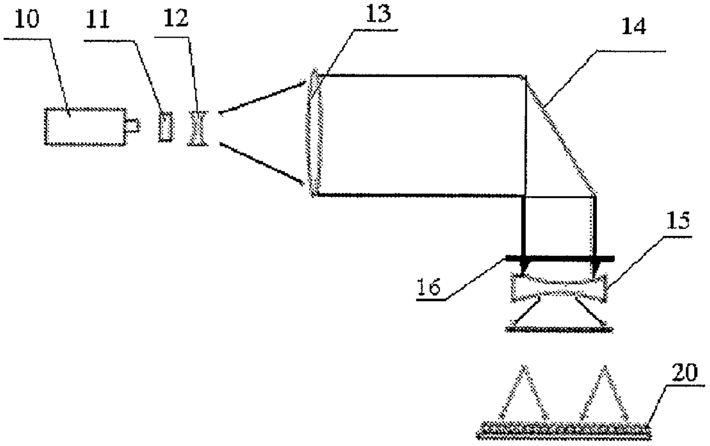
FIG. 2 is a structural schematic diagram of the device for recording dynamic floating images on the sheet.
Figure 3:
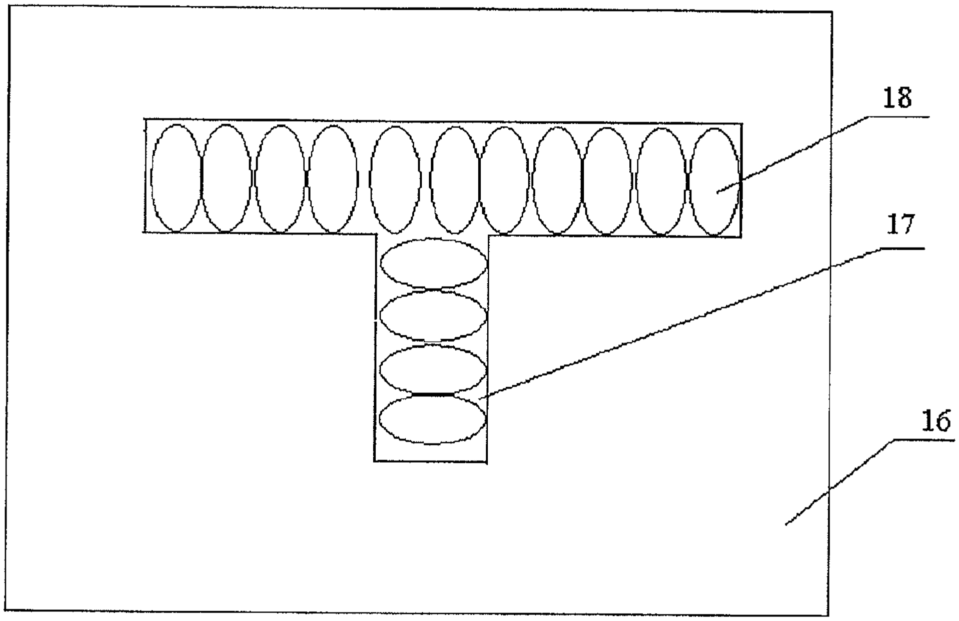
FIG. 3 is a structural schematic diagram of the shading template.

FIG. 2 is a device for recording picture-text. Referring to FIG. 2 and FIG. 3, the device of the present invention comprises a laser 10, an astigmatism modulator 11, a beam expander 12, an autocollimator objective 13, a 45° total-reflection mirror 14, a positive aspheric mirror or a negative aspheric mirror 15, and a shading template 16 provided with picture-text pores 17, the picture-text pores 17 of the shading template 16 are provided with negative aspheric lenses or positive aspheric lenses 18.

The said astigmatism modulator 11 is disposed at one end of the laser 10 to change the beam emitted from a laser beam to a scattered beam for homogenizing the beam; the said beam expander 12 is disposed at another end of the astigmatism modulator 11 for expanding the laser beam; the said autocollimator objective 13 is disposed at another end of the astigmatism modulator 11 to change the laser beam to collimated parallel light; the said 45° total-reflection mirror 14 is disposed at another end of the autocollimator objective 13 to turn the laser beam for 45°; the said shading template 16 provided with picture-text pores 17 is disposed at a lower part of the 45° total-reflection mirror 14; the said positive aspheric mirror or negative aspheric mirror 15 is disposed at a lower part of the shading template 16.

Preferably, the said negative aspheric lenses or the positive aspheric lenses 18 have curvature radius of 0.18 to 0.35 μm.

The present invention operates according to the following principles: the above sheet 20 whereon picture-text is to be recorded is disposed at a lower part of the shading template 16, a light emitted from the laser becomes scattered beam after passing through the astigmatism modulator 11 so as to homogenize the beam. After being expanded by the beam expander 12 and then collimated, the resultant beam passes through the shading template 16 provided with picture-text pores 17 and then passes through the positive aspheric mirror or the negative aspheric mirror 15. Since the picture-text pores 17 are provided with negative aspheric lenses or positive aspheric lenses 18, images of picture-text formed on the sheet are imaged clearly at a position of 10 mm above or beneath the sheet, then radiated on the sheet vertically. As a result, photosensitive materials on the sheet are subjected to exposure so as to show dynamic images, wherein the resultant dynamic images are floated above or beneath the sheet.

The invention claimed is:

1. A sheet enabling to form dynamic three-dimensional images, characterized in that:

the sheet comprises a base layer, a transparent protective layer, a reflective layer, and pixel points that can form images;

said transparent protective layer is disposed at one side of the base layer, and the said pixel points are embedded in the said transparent protective layer;

said pixel points comprising a plurality of microlenses disposed close to one another, said reflective layer is disposed bent at a lower part of said microlenses, wherein picture-text is recorded in the reflective layer, said microlenses appear as a curved surface protruding upwardly or a curved surface bending downwardly, there is an altitude difference H between horizontal positions of two adjacent pixel points, the microlenses in a pixel point have the same curvature radius, and the curvature radius of microlenses in two adjacent pixel points have a difference of 1 to 70 μm.

2. The sheet enabling to form dynamic three-dimensional images according to claim 1, characterized in that the altitude difference H between horizontal positions of two adjacent pixel points is 0.07 to 0.08 mm.

3. The sheet enabling to form dynamic three-dimensional images according to claim 2, characterized in that the said curved surface is a spheric or aspheric surface.

4. The sheet enabling to form dynamic three-dimensional images according to claim 2, characterized in that the altitude difference H between horizontal positions of two adjacent pixel points is 0.07 to 0.08 mm.

5. The sheet enabling to form dynamic three-dimensional images according to claim 2, characterized in that the curvature radius of all microlenses of at least one pixel point is 0.065 to 0.075mm.

6. The sheet enabling to form dynamic three-dimensional images according to claim 5, characterized in that the difference of curvature radius of microlenses in two adjacent pixel points is 10 to 20 μm.

7. The sheet enabling to form dynamic three-dimensional images according to claim 6, characterized in that the number of microlenses in the pixel points is 2 to 42.

8. The sheet enabling to form dynamic three-dimensional images according to claim 2, characterized in that the curvature radius of all microlenses of at least one pixel point is 0.065 to 0.075 mm, the difference of curvature radius of microlenses in two adjacent pixel points is 10 to 20 μm, and the number of microlenses in the pixel points is 2 to 42.

9. The sheet enabling to form dynamic three-dimensional images according to claim 1, characterized in that the curvature radius of all microlenses of at least one pixel point is 0.065 to 0.075 mm.

10. The sheet enabling to form dynamic three-dimensional images according to claim 9, characterized in that the curvature radius of all microlenses of at least one pixel point is 0.070 mm.

11. The sheet enabling to form dynamic three-dimensional images according to claim 10, characterized in that the said curved surface is a spheric or aspheric surface.

12. The sheet enabling to form dynamic three-dimensional images according to claim 9, characterized in that the said curved surface is a spheric or aspheric surface.

13. The sheet enabling to form dynamic three-dimensional images according to claim 1, characterized in that the difference of curvature radius of microlenses in two adjacent pixel points is 10 to 20 μm.

14. The sheet enabling to form dynamic three-dimensional images according to claim 13, characterized in that the said curved surface is a spheric or aspheric surface.

15. The sheet enabling to form dynamic three-dimensional images according to claim 1, characterized in that the number of microlenses in the pixel points is 2 to 42.

16. The sheet enabling to form dynamic three-dimensional images according to claim 15, characterized in that the said curved surface is a spheric or aspheric surface.

17. The sheet enabling to form dynamic three-dimensional images according to claim 1, characterized in that the said curved surface is a spheric or aspheric surface.

18. The sheet enabling to form dynamic three-dimensional images according to claim 17, characterized in that the said curved surface is a paraboloid, hyperboloid or high-order curved surface.

19. A device for recording dynamic floating images on a sheet so as to prepare the sheet according to claim 1, the device comprises a laser, characterized in that:

the device further comprises an astigmatism modulator, a beam expander, an autocollimator objective, a 45° total-reflection mirror, a positive aspheric mirror or negative aspheric mirror, and a shading template provided with picture-text pores, the picture-text pores of the shading template are provided with negative aspheric lenses or positive aspheric lenses;

said astigmatism modulator is disposed at one end of the laser, the beam expander is disposed at another end of the astigmatism modulator, said autocollimator objective is disposed at another end of the astigmatism modulator, said 45° total-reflection mirror is disposed at another end of the autocollimator objective, said shading template provided with the picture-text pores is disposed vertically at a lower part of the 45° total-reflection mirror, said positive aspheric mirror or the negative aspheric mirror is disposed at a lower part of the shading template.

20. The device for recording dynamic floating images on a sheet according to claim 9, wherein the negative aspheric lens or the positive aspheric lens have a curvature radius of 0.18 to 0.35 μm.

* * * * *